United States Patent [19]

Meyers

[11] Patent Number: 5,715,090
[45] Date of Patent: Feb. 3, 1998

[54] COLOR CORRECTED VIEWFINDER INCLUDING A NEGATIVE POWER LENS COMPONENT HAVING A DIFFRACTIVE SURFACE

[75] Inventor: Mark M. Meyers, Hamlin, N.Y.

[73] Assignee: Eastman Kodak Company, Rochester, N.Y.

[21] Appl. No.: 602,516

[22] Filed: Feb. 20, 1996

[51] Int. Cl.$^6$ .............. G02B 27/44; G02B 3/08; G02B 13/04
[52] U.S. Cl. .............. 359/565; 359/570; 359/743; 359/744
[58] Field of Search .............. 359/558, 565, 359/570, 16, 19, 742, 743, 744, 793, 784

[56] References Cited

U.S. PATENT DOCUMENTS

| | | | |
|---|---|---|---|
| 4,256,396 | 3/1981 | Kawaguchi et al. | 354/222 |
| 5,013,113 | 5/1991 | Buralli | 350/162.11 |
| 5,044,706 | 9/1991 | Chen | 359/565 |
| 5,073,007 | 12/1991 | Kedmi et al. | 359/565 |
| 5,078,513 | 1/1992 | Spaulding | 385/14 |
| 5,221,993 | 6/1993 | Nomura | 359/601 |
| 5,268,790 | 12/1993 | Chen | 359/558 |
| 5,300,977 | 4/1994 | Lewis et al. | 354/222 |
| 5,317,451 | 5/1994 | Hasushita | 359/643 |
| 5,353,158 | 10/1994 | Matsuo | 359/688 |
| 5,361,149 | 11/1994 | Hasegawa et al. | 359/9 |
| 5,555,479 | 9/1996 | Nakagiri | 359/565 |

FOREIGN PATENT DOCUMENTS

| | | | |
|---|---|---|---|
| 742610 | 10/1943 | Germany | 359/744 |
| 52-62023 | 5/1977 | Japan | 359/744 |
| 55-93116 | 1/1979 | Japan | 359/744 |

OTHER PUBLICATIONS

"Lens Design Fundamentals," Rudolf Kingslake, pp. 343–345.

"Lenses in Photography," The Practical Guide to Optics for Photographers, by Rudolf Kingslake, pp. 254–257.

"Applied Photographic Optics," Imaging Systems for Photography, Film and Video, by Sidney F. Ray, pp. 370–382.

Primary Examiner—Jon W. Henry
Attorney, Agent, or Firm—Svetlana Z. Short

[57] ABSTRACT

A viewfinder having an optical axis and comprising a negative lens component including a lens element having a first diffractive surface which introduces a phase modification $\phi(r)$ into a light wavefront passing through this diffractive surface and a positive lens component receiving phase modified light from the negative power lens component.

12 Claims, 8 Drawing Sheets

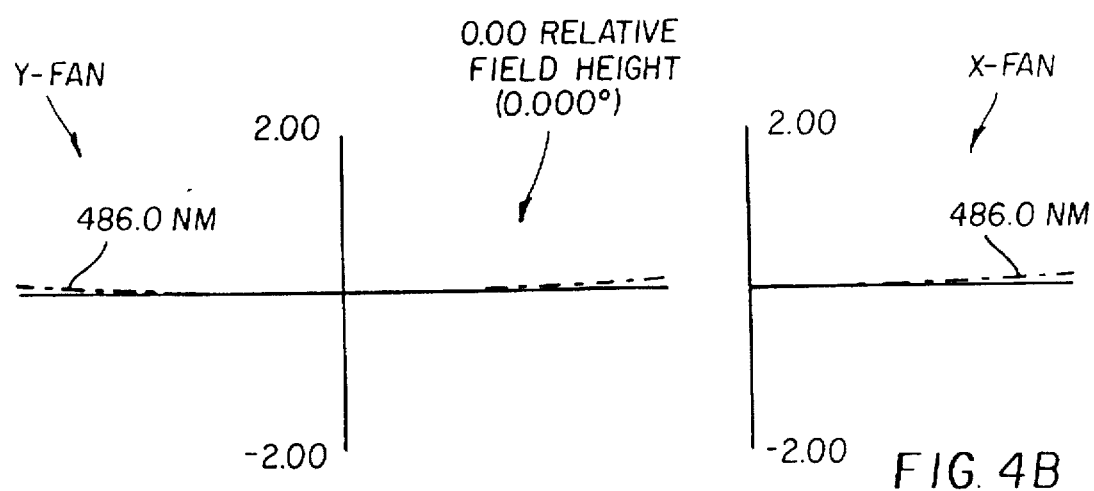
FIG. 4A / FIG. 4B
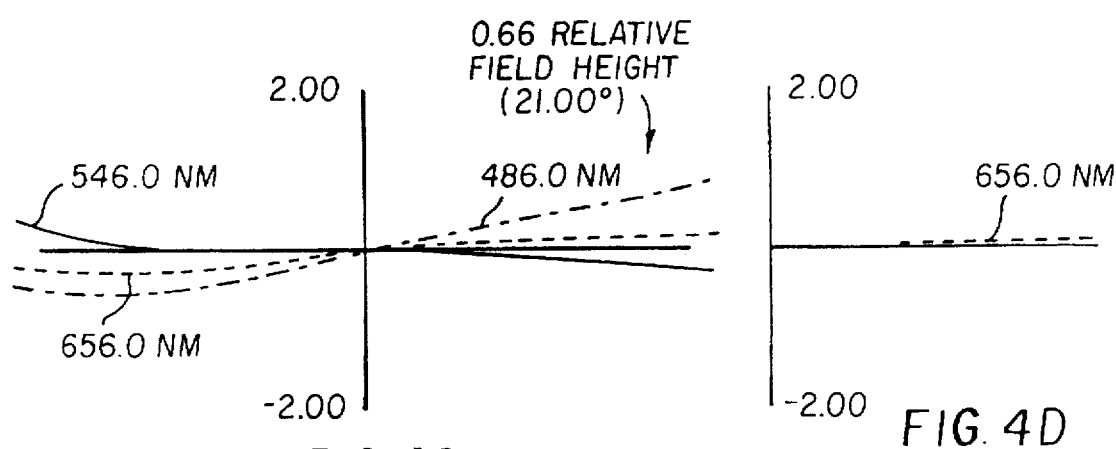
FIG. 4C / FIG. 4D
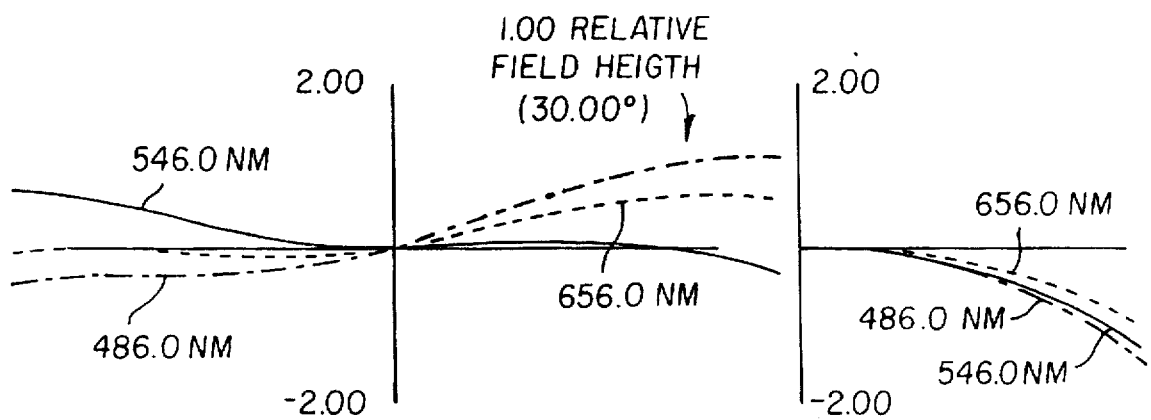
FIG. 4E / FIG. 4F

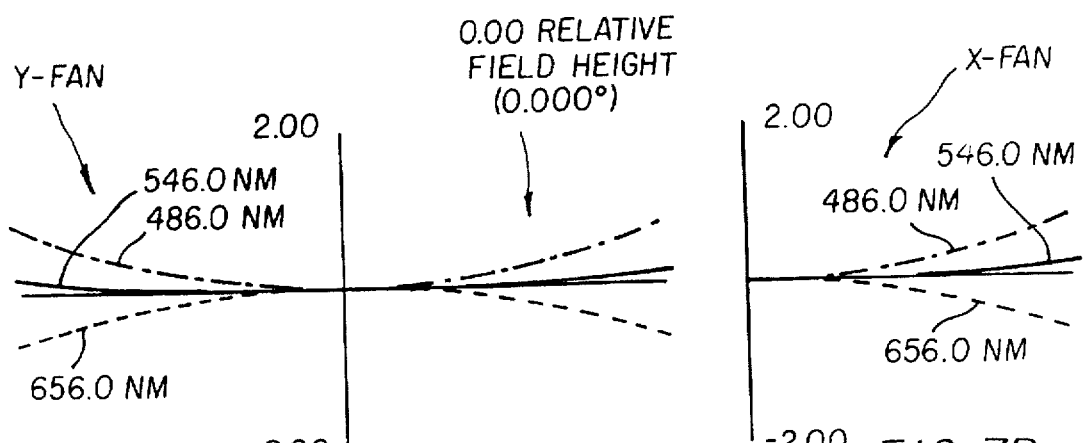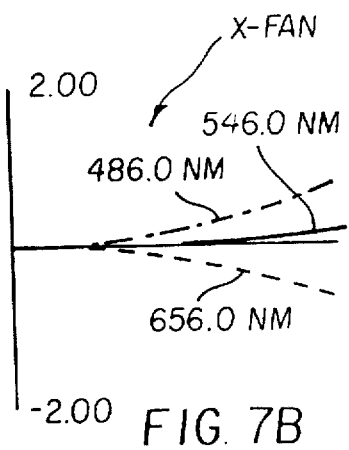
FIG. 7A
FIG. 7B
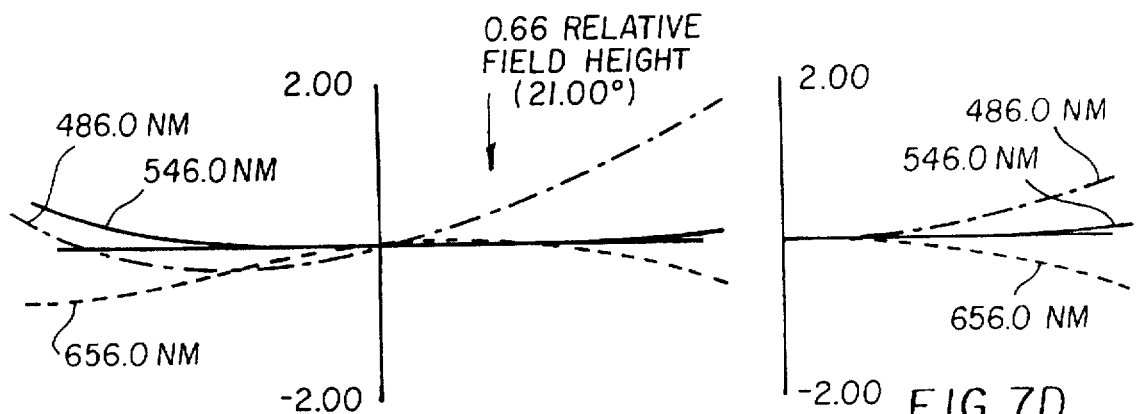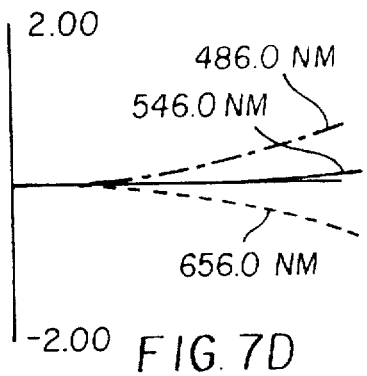
FIG. 7C
FIG. 7D
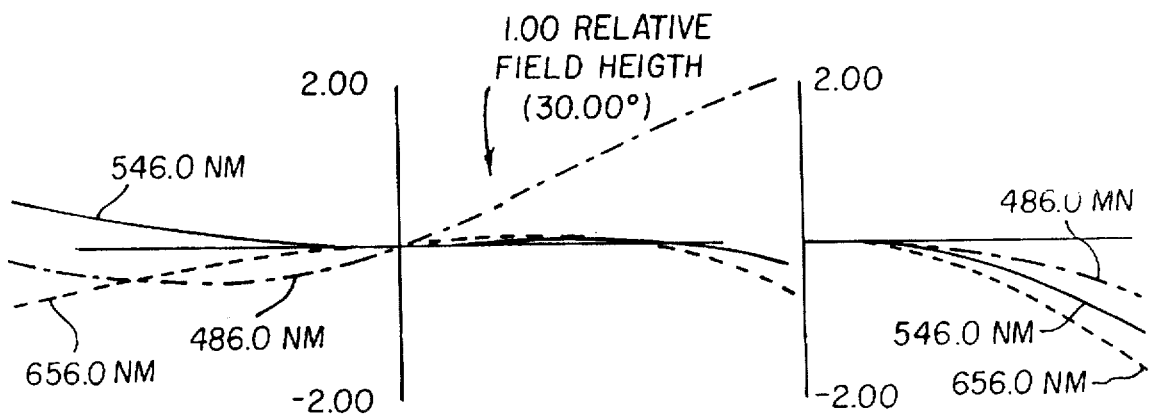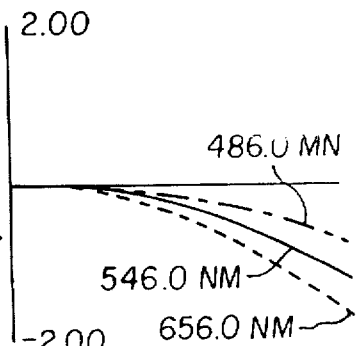
FIG. 7E
FIG. 7F

COLOR CORRECTED VIEWFINDER INCLUDING A NEGATIVE POWER LENS COMPONENT HAVING A DIFFRACTIVE SURFACE

BACKGROUND OF THE INVENTION

1. Field of the Invention

The present invention relates to improvements in viewfinders and more particularly, to viewfinders having a diffractive lens component.

2. Description of the Prior Art

Reverse Galilean viewfinders are known. Such viewfinders comprise a front, negative lens component and a rear, positive lens component. The front, negative power lens component is relatively large and the rear, positive power lens component is relatively small. The eye of the viewer is located about 20 millimeters behind the positive lens component. The rim of the front lens component serves as a mask to delimit the viewfinder's field of view.

A typical Reverse Galilean viewfinder suffers from axial and lateral color aberrations. As a result, the view through such a viewfinder is of poor quality and low resolution. An example of a typical Reverse Galilean viewfinder is disclosed in "Lens Design Fundamentals," by Rudolf Kingslake, pages 343–345; "Lenses in Photography," *The Practical Guide to Optics for Photographers*, by Rudolf Kingslake, pages 254–257; and "Applied Photographic Optics," *Imaging Systems for Photography, Film and Video*, by Sidney F. Ray, pages 374–376. Similar viewfinders having more than two lens components are described in U.S. Pat. No. 4,256,396, issued Mar. 17, 1981, in the names of Taizo Kawaguchi and Haruo Kobayashi; and U.S. Pat. No. 5,317,451, issued May 31, 1994, in the name of Sachio Hasushita. These viewfinders also suffer from color aberrations.

Refractive/diffractive hybrid lens elements are known. U.S. Pat. No. 5,268,790, issued to C. W. Chen on Dec. 7, 1993, discloses such a lens element. Zoom lenses, for use in camera objectives, having lens groups in which diffractive elements replace more complex refractive elements, are the subject matter of provisional patent application Ser. No. 60/002,438, entitled ZOOM LENSES, in the names of Lee R. Estelle and Barbara J. Kouthoofd; and provisional patent application Ser. No. 60/002,441, entitled ZOOM LENS, in the name of Mark M. Meyers, both applications simultaneously filed on Aug. 16, 1995 and assigned to the Eastman Kodak Company.

Such zoom lenses as have been proposed, require four or more lens elements in order to reduce aberrations and obtain acceptable image quality. For further information concerning hybrid refractive/diffractive lenses, reference may be had to the above-cited Chen patent and Estelle et al. applications and, for example, to U.S. Pat. No. 5,013,133, issued to D. A. Buralli on May 7, 1991, and U.S. Pat. No. 5,078,513, issued to K. Spaulding on Jan. 7, 1992; and to U.S. patent applications filed in the name of the inventor hereof, namely Ser. Nos. 08/174,737 and 08/175,708, both filed Dec. 29, 1993; and 08/292,349, filed Aug. 17, 1994 and all three cases being assigned to the Eastman Kodak Company. The Buralli and Spaulding patents provide information as to the design of Diffractive Optical Elements (DOEs).

SUMMARY OF THE INVENTION

It is a principal object of the present invention to provide an improved viewfinder.

A further object of the present invention is to provide an improved Reverse Galilean viewfinder characterized by low color aberration.

The above and other objects of the present invention are achieved by a viewfinder having an optical axis, where the viewfinder comprises a negative power lens component having a diffractive surface which introduces a phase modification $\phi(r)$ into a light wavefront passing through that diffractive surface and a positive power lens component receiving phase modified light from the negative power lens component. The phase modification $\phi(r)$ imparted by the diffractive surface is defined by the following equation $$\phi(r) = \sum_{i=1}^{i=n} \frac{2\pi}{\lambda_0} (C_i r^{2i}),$$

where r is a height from the optical axis on the diffractive surface of the lens component, $\lambda_0$ is a wavelength of light, i is an integer from 1 to n, $C_i$ is a set of coefficients defining the diffractive surface and $C_1$ is positive.

According to another embodiment of the present invention the positive lens component has a second diffractive surface.

According to yet another preferred embodiment of the present invention the diffractive surface of the positive lens component is defined by the phase modification equation in which the first coefficient $C_1$ is negative.

It is an advantage of the viewfinder of the present invention that it provides a superior image quality.

BRIEF DESCRIPTION OF THE DRAWINGS

FIGS. 4A–4H are graphical representations of the aberration of the viewfinder illustrated in FIG. 1;

FIGS. 7A–7H are graphical representations of the aberration of the viewfinder illustrated in FIG. 5.

DESCRIPTION OF THE PREFERRED EMBODIMENT

Figure 1:
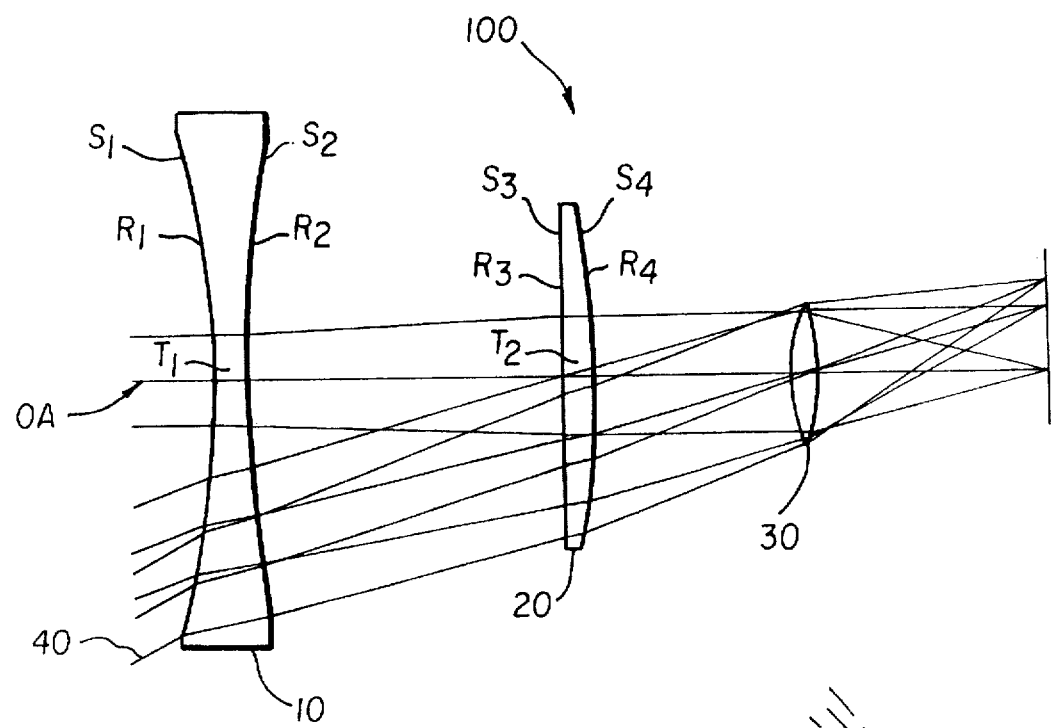
FIG. 1 shows a sectional view of a viewfinder 100 of a first preferred embodiment of the present invention.
Figure 5:
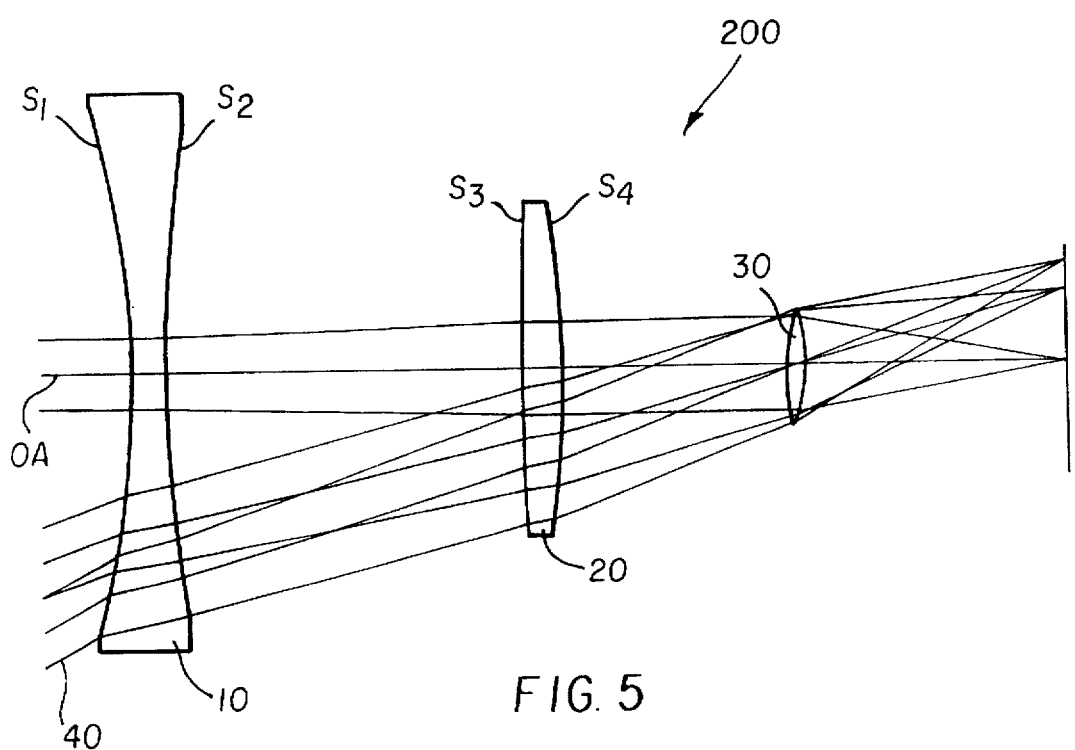
FIG. 5 shows a sectional view of a viewfinder 200 of a second preferred embodiment.

The embodiments of the invention are illustrated by examples shown in FIGS. 1 and 5 which are set forth in Tables 1A–1B, and 2A–2B, respectively.

FIGS. 4A–4F and 7A–7F detail the performance of the viewfinders 100 and 200.

In the tables and the drawings, the surfaces S and the corresponding radii R are numbered by subscripts from the front or object side of the lens to the rear or image side of the lens (where the viewer's eye is located). The thickness T of the lens elements are also numbered from front to rear. For example, $T_1$ corresponds to the thickness of the first lens element and $T_2$ to the thickness of the second lens element. In the tables, spaces and thicknesses are listed on the same line as the surface preceding the space or thickness, as the case may be. The radii, thicknesses and the spacings provided in the tables are in millimeters.

Description of the Viewfinder

According to the first embodiment of the present invention a viewfinder 100 comprises two lens components 10 and 20 (FIG. 1). The front, divergent lens component 10 has negative optical power and is a single, biconcave lens element made from polymethyl methacrylate (PMMA). This biconcave lens element has a concave object side surface $S_1$ and a concave image side surface $S_2$. The surface $S_2$ is weaker than the surface $S_1$. The rear, convergent lens component 20 is situated between the front lens component and the location of the viewer's eye lens 30. The lens component 20 is also made from polymethyl methacrylate (PMMA). It has positive optical power and it is a single biconvex lens element. This biconvex lens element has a convex object side surface $S_3$ and a convex image side surface $S_4$. Surface $S_3$ is weaker than surface $S_4$. Other optical materials, glass or plastic, can be used instead of PMMA in making these lens elements.

The surface $S_2$ of lens component 10 and the surface $S_3$ of the lens component 20 are diffractive surfaces having zone structure provided by a plurality of facets. These diffractive surfaces are described by the following phase modification equation.

$$\phi(r) = \sum_i \frac{2\pi}{\lambda_0}(C_i r^{2i}) = \frac{2\pi}{\lambda_0}(C_1 r^2 + C_2 r^4 + C_3 r^6 + C_4 r^8 + C_5 r^{10} + C_6 r^{12} \ldots)$$

where $\phi(r)$ is the phase modification introduced by a diffractive surface into a light wavefront passing through the diffractive surface, r is the height from the optical axis on the diffractive surface of the lens component and $C_1$, $C_2$, $C_3$, etc. are coefficients defining the diffractive surface. The diffractive order m is +1 (first order). For this embodiment $\lambda_0=546$ nm.

According to one feature of the present invention, it is preferred that the diffractive surfaces be the internal surfaces of the view finder. It is also preferred that in a given lens element the diffractive surface is placed on a weaker radius of curvature. These two requirements minimize light scatter and make manufacturing easier. In particular, these requirements minimize scatter problems resulting from off-axis originated white light scattering of the manufacturing imperfections on the facets. In addition, the first requirement keeps these diffractive surfaces free of finger prints and scratches which jeopardize the image quality.

Figure 2A:
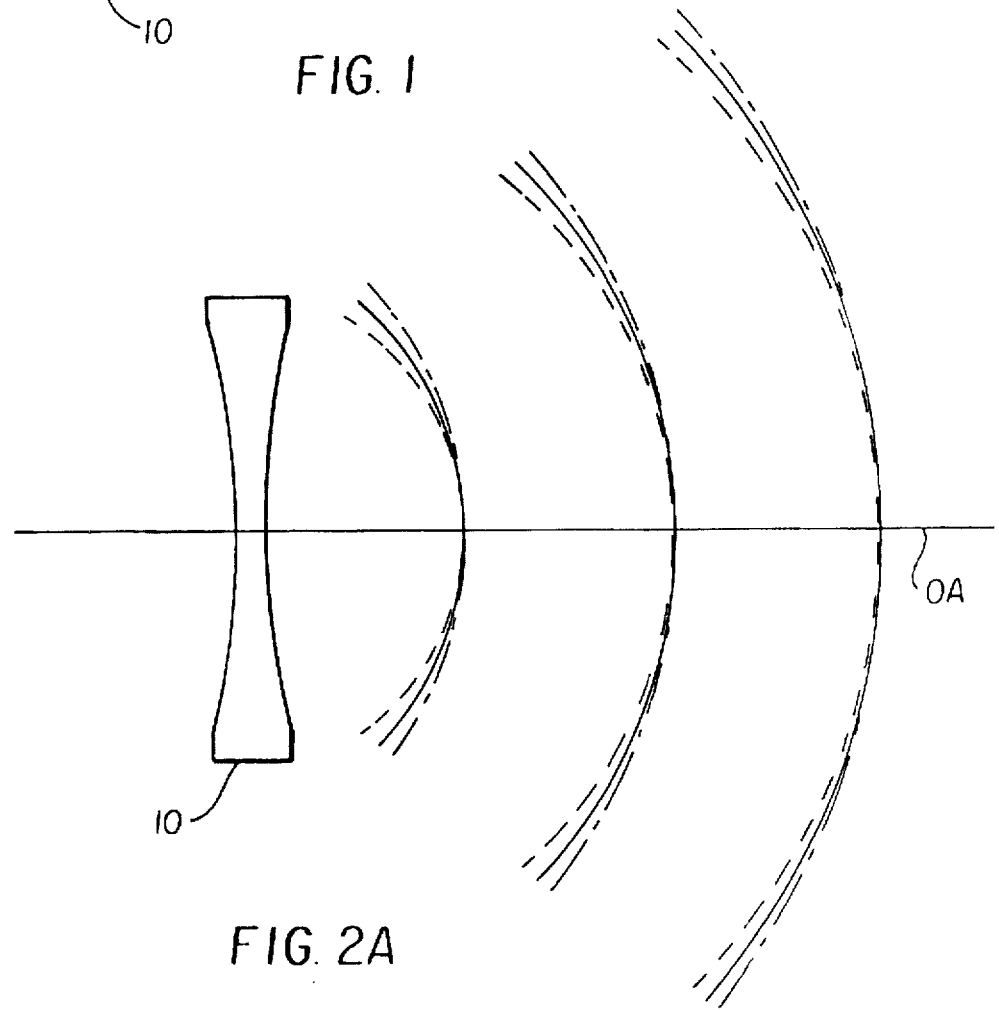
FIG. 2A is a schematic representation of a wavefront emanating from the negative lens component of the viewfinder illustrated in FIG. 1.

With reference to FIG. 1, the front negative power lens component 10 bends off-axis rays 40 more than the positive power lens component 20 and introduces lateral color aberration into the lens system. Thus, according to another feature of the present invention, it is preferred to locate the first diffractive surface on the rear surface of the front negative power lens component to minimize lateral color aberration. It is also preferred to make the diffractive surface of the front lens component in such a way that it adds overall negative power to the front lens component thus making it even more negative. More specifically, it is preferred that the first coefficient $C_1$ (of equation 1) defining the diffractive surface on the negative lens component 10 be positive regardless of the shape of this surface. The diffractive surface is designed to introduce a phase delay into the wavefront emanating from this lens component (FIG. 2A).

Figure 2B:
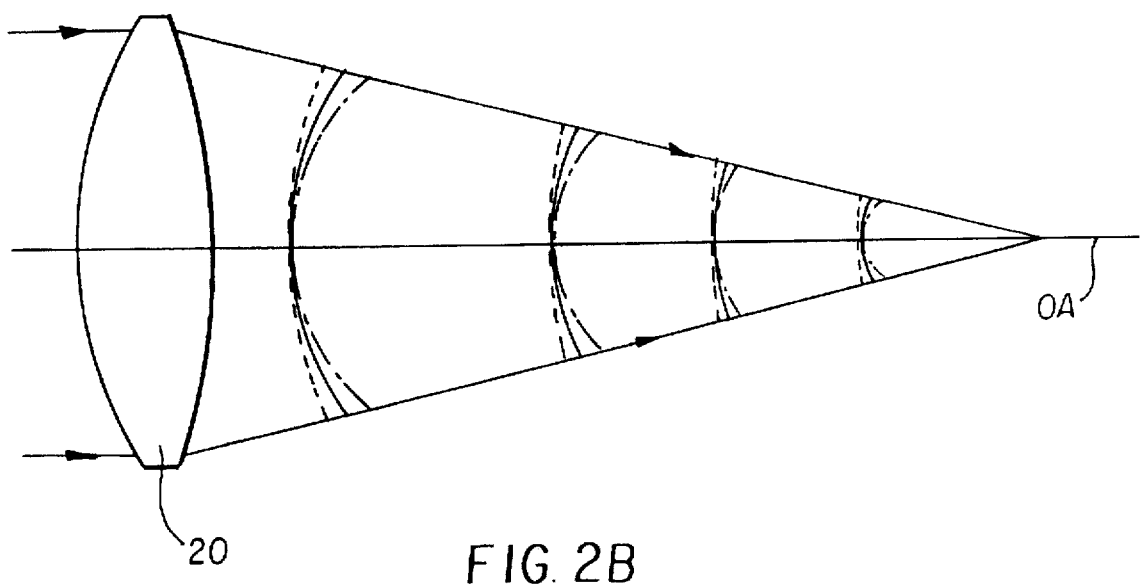
FIG. 2B is a schematic representation of a wavefront emanating from the positive lens component of the viewfinder illustrated in FIG. 1.

The second diffractive surface is used to minimize axial color aberration. It is also preferred to make the diffractive surface of the rear lens component 20 in such a way that it adds overall positive power to the rear lens component 20 making it even more positive. This second diffractive surface is designed to put the wavefront forward of the wavefront that would be produced if the diffractive surface was not there. (FIG. 2B). It is preferred that the first coefficient $C_1$ describing the second diffractive surface (of the positive power lens component 20) be negative whether the surface is convex, plano, or concave. In this embodiment the value for the two coefficients $C_1$ are approximately 3.39E-04 and -2.42E-04, respectively.

The higher order coefficients ($C_2$, $C_3$, etc.) for both of the two diffractive surfaces are designed to modify the edges of the wavefront emanating out of these two lens components 10 and 20. These coefficients enable the viewfinder to have a superior aberration correction. It is preferred that some of the higher order coefficients be positive and some be negative. It is even more preferred for these coefficients to be of opposite sign from the preceding coefficient if the value of the preceding coefficient is non-zero. For this embodiment, the numerical values for the coefficients $C_i$ are provided in Table 1B. The wavefronts emanating out of these two lens components 10 and 20 are illustrated in FIGS. 2A and 2B. More specifically, FIGS. 2A and 2B show schematically with an alternating dash-dotted line a propagating spherical wavefront that would be emanating out of the front negative power lens component if this lens component did not have the diffractive surface. It also shows a wavefront (dashed line) emanating from the front negative power lens component that has a diffractive profile represented by the first order term $C_1$ only. A solid line shows the effect on the wavefront when other (higher order) terms are present to define the diffractive surface.

Figure 3A:
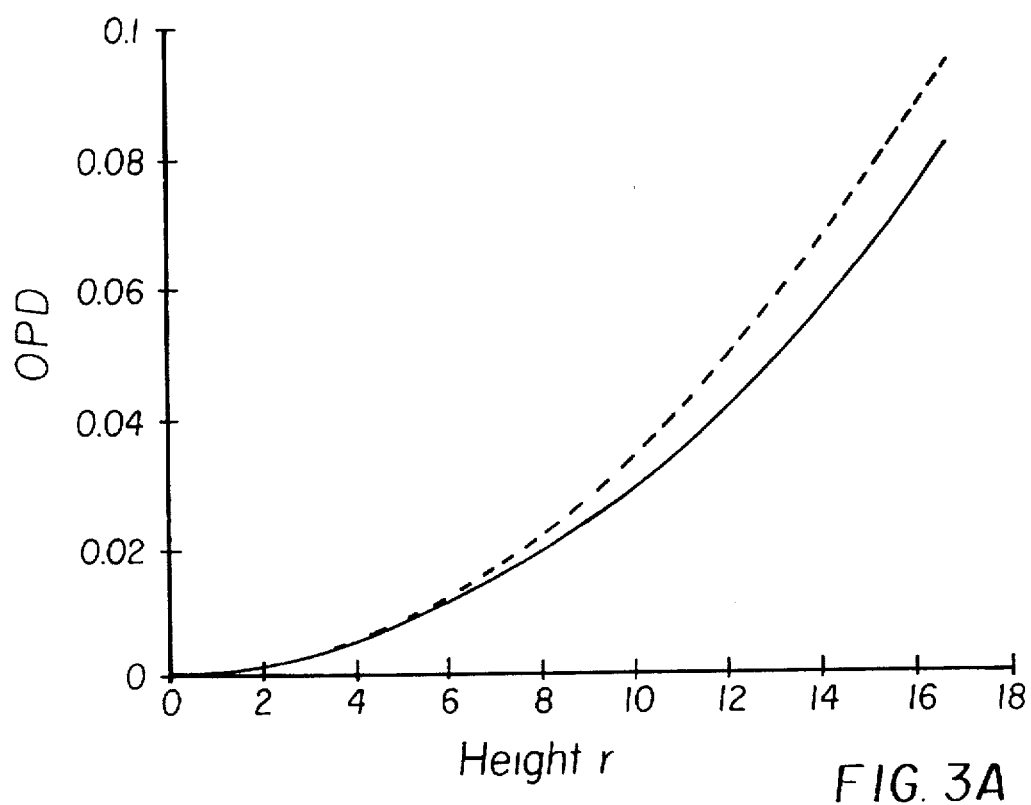
FIG. 3A is an OPD plot of the wavefront propagating out of the negative lens component of the viewfinder illustrated in FIG. 1.

FIG. 3A provides a plot of the wavefront propagating out of the negative lens component 10. The vertical axis represents the optical path difference (OPD) from the wavefront generated by the refractive component without the diffractive surface. The horizontal axis represents height r from the optical axis on the diffractive surface of the lens component 10. This graph also shows that the wavefront emanating from the lens component 10 having a diffractive surface defined by both the $C_1$ term and the higher order terms ($C_1$, $C_2$, $C_3$, etc.) diverges slower at higher r values than the wavefront that would be emanating from this component if no higher order terms were present.

Figure 3B:
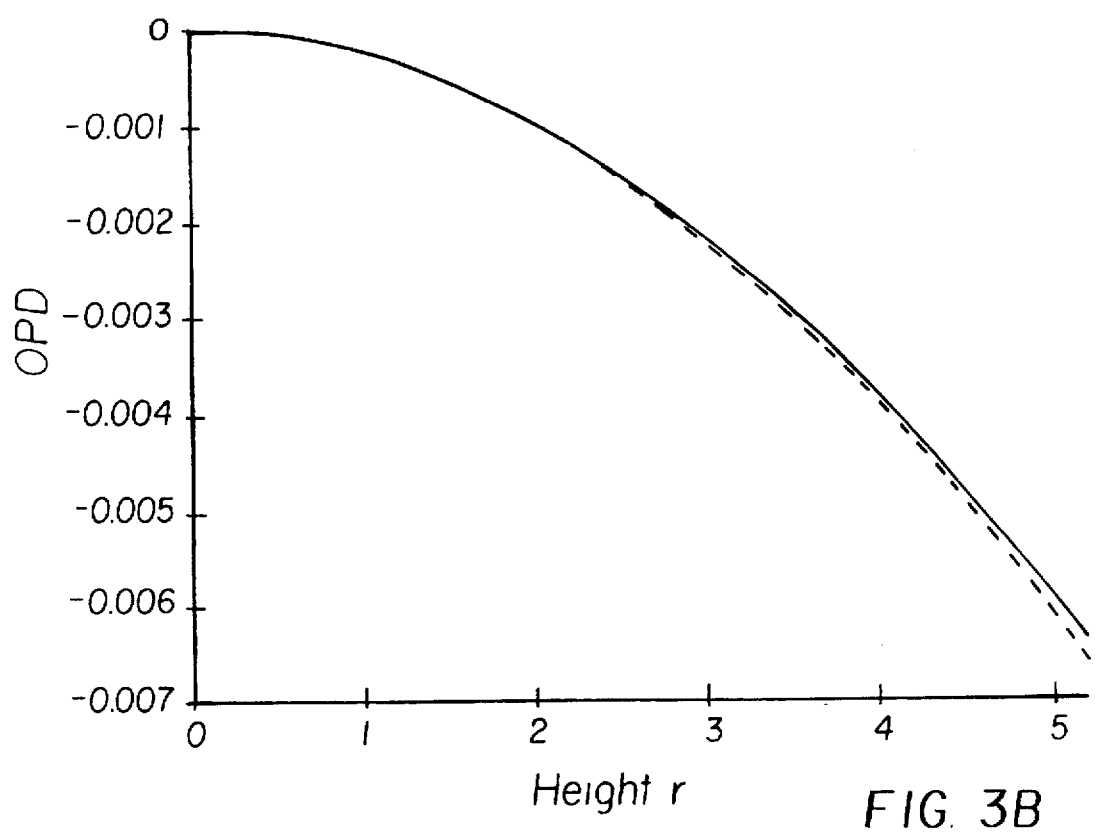
FIG. 3B is an OPD plot of the wavefront propagating out of the positive lens component of the viewfinder illustrated in FIG. 1.

FIG. 3B provides a plot of the wavefront propagating out of the positive lens component 20. The vertical axis represents the optical path difference OPD (from the wavefront generated by the refractive component without the diffractive surface) and the horizontal axis represents height r from the optical axis on the diffractive surface of the lens component 20. This graph also shows that the wavefront emanating from the lens component 20 having a diffractive surface defined by both the C1 term and the higher order terms converges faster at higher r values than the wavefront that would be emanating from this component if no higher order terms were present.

Figure 4G:
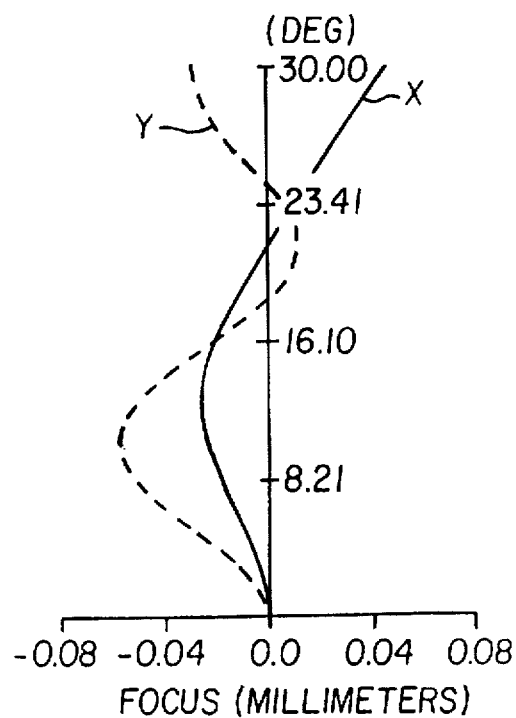

FIGS. 4A–H provide aberration plots for the viewfinder 100. More specifically, FIGS. 4A, 4C and 4E provide Y-ray (meridian rays) intercept plots when the view finder is operating at 0, 0.7 and full field of view, respectively. FIGS. 4B, 4D and 4F provide X-ray (sagittal rays) intercept plots when the viewfinder is operating at 0, 0.7 and full field of view, respectively. The ray displacement (OPD) along the vertical axis is measured in waves.

Figure 4H:
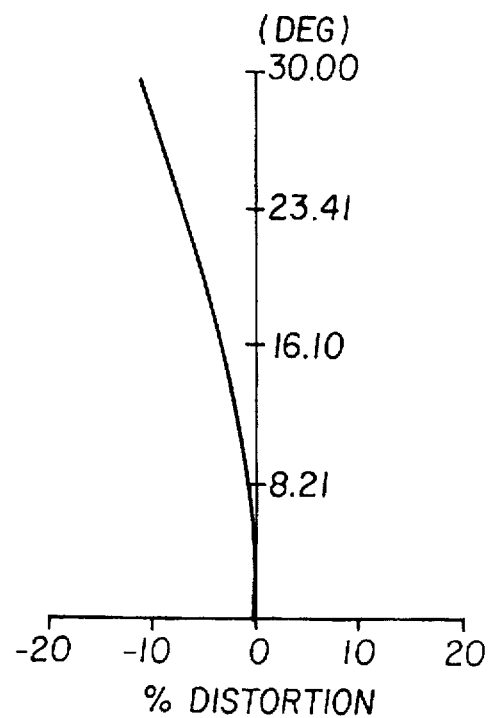

FIGS. 4G and 4H show astigmatism and distortion, respectively.

Figure 6:
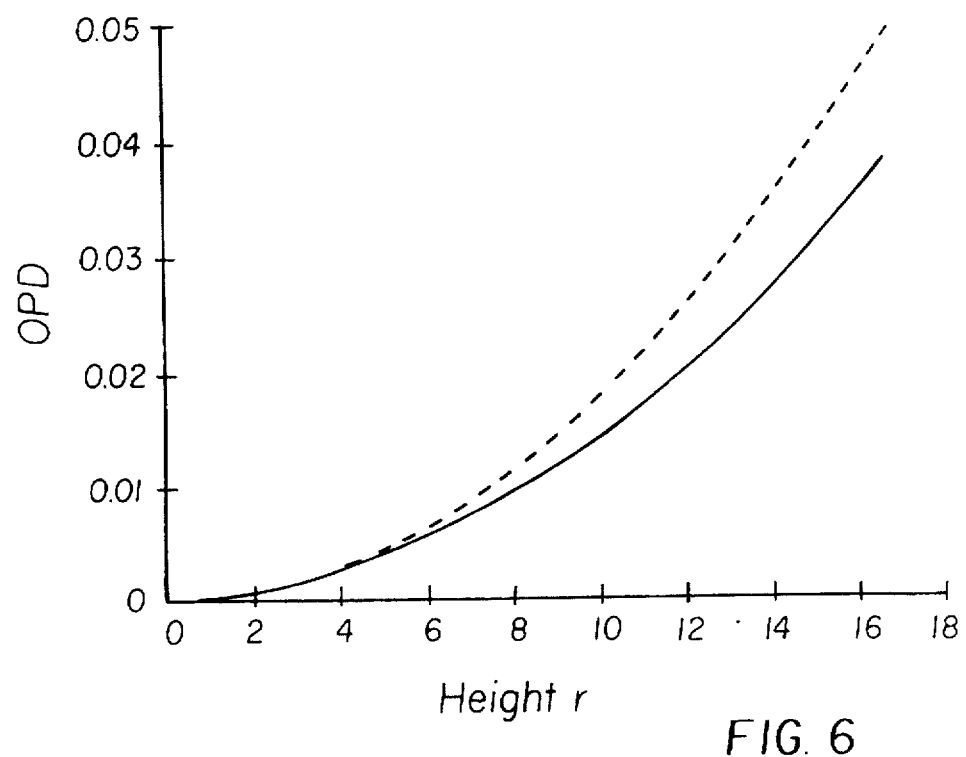
FIG. 6 is an OPD plot of the wavefront propagating out of the negative lens component of the viewfinder illustrated in FIG. 5

The second embodiment of the present invention is illustrated in FIG. 5 and is very similar to the first embodiment which is illustrated in FIG. 1. According to the second embodiment of the present invention a viewfinder 200 also comprises two lens components 10 and 20. The front, divergent lens component 10 has negative optical power and is a single, biconcave lens element. This biconcave lens element has a concave object side surface $S_1$ and a concave image side surface $S_2$. The surface $S_2$ is weaker than the surface $S_1$. The rear lens component 20 is situated between the front lens component and the viewer's eye location. The lens component 20 has positive optical power and is a single biconvex lens element. This biconvex lens element has a convex object side surface $S_3$, and a convex image side surface $S_4$. Surface $S_3$ is weaker than surface $S_4$. The primary difference between the second embodiment and the first embodiment is that the second embodiment has only one diffractive surface. This diffractive surface is located on the front lens component 10 and is used to minimize lateral color and to correct higher order aberrations. The first coefficient C1 describing the first diffractive surface on the negative lens component 10 according to the above-given phase modification equation is positive. More specifically, the numerical value of this coefficient is approximately 1.78E-04. The aspheric coefficients $C_2$ through $C_6$ for this diffractive surface are designed to retard the edges of the wavefront emanating out of this lens component. This is illustrated in FIG. 6. As in the previously disclosed embodiment the use of the diffractive surface on the rear surface of lens component 10 provides color correction and superior aberration control while minimizing light scatter for the directly impinging light coming from overhead.

Figure 7G:
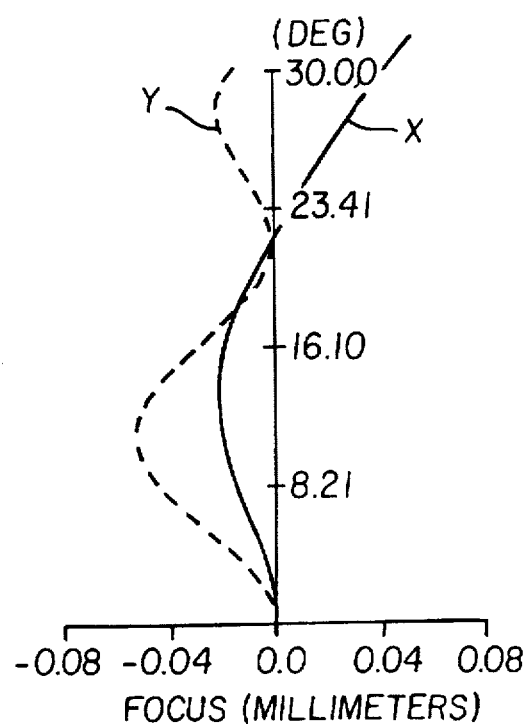

FIGS. 7A–H provide aberration plots for the viewfinder 200. FIGS. 7A, 7C and 7E provide Y-ray intercept plots when the viewfinder is operating at 0, 0.7 and full field of view, respectively. FIGS. 7B, 7D and 7F provide X-ray intercept plots when the viewfinder is operating at 0, 0.7 and full field of view, respectively. The ray displacement (OPD) along the vertical axis is measured in waves.

Figure 7H:
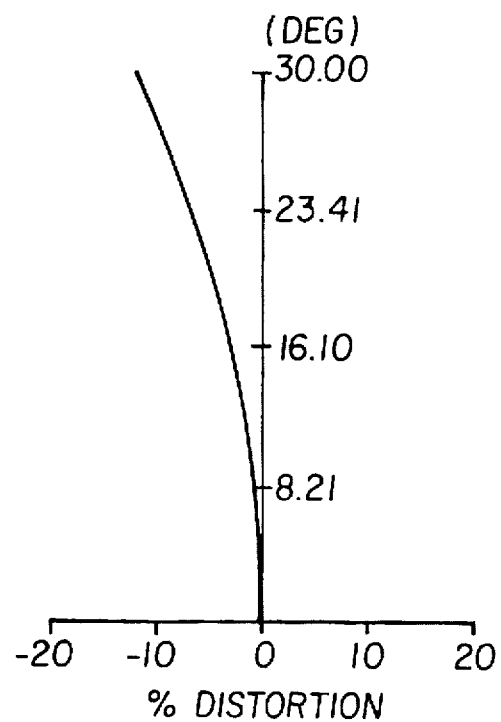

FIGS. 7G and 7H show astigmatism and distortion, respectively.

As we can see from the aberration curves, the resulting image quality is very high given the small number of lens elements.

TABLE 1A

| Surface | Radius | Thickness | Material |
| --- | --- | --- | --- |
| $S_1$ | −87.368 | 3.0 | PMMA |
| $S_2$* | 141.197 | 30.0 | |
| $S_3$* | 597.538 | 3.4 | PMMA |
| $S_4$ | −80.371 | 20.0 | |

*diffractive

TABLE 1B

Coefficients for the diffractive surface S2

$C_1 = 3.3888E-04$
$C_2 = -9.3565E-07$
$C_3 = 6.4664E-09$

TABLE 1B-continued $C_4 = -2.0992E-11$
$C_5 = 3.375E-14$
$C_6 = -2.1799E-17$

Coefficients for the diffractive surface S3

$C_1 = -2.4216E-04$
$C_2 = 3.8018E-07$
$C_3 = -4.5941E-09$
$C_4 = 2.0329E-11$
$C_5 = -2.4147E-14$

| Wavelength | PMMA Refractive index |
| --- | --- |
| $\lambda_1 = 486$ nm | 1.49778 |
| $\lambda_2 = 546$ nm | 1.493777 |
| $\lambda_3 = 656$ nm | 1.489197 |

TABLE 2A

| Surface | Radius | Thickness | Material |
| --- | --- | --- | --- |
| $S_1$ | −83.026 | 3.0 | PMMA |
| $S_2$* | 147.938 | 30.0 | |
| $S_3$ | 513.199 | 3.4 | PMMA |
| $S_4$ | −77.518 | 20.0 | |

*diffractive

TABLE 2B

Coefficients for the diffractive surface S2

$C_1 = 1.7779E-04$
$C_2 = -7.0653E-07$
$C_3 = 4.7503E-09$
$C_4 = -1.5082E-11$
$C_5 = 2.2553E-14$
$C_6 = -1.2894E-17$

| Wavelength | PMMA Refractive index |
| --- | --- |
| $\lambda_1 = 486$ nm | 1.49778 |
| $\lambda_2 = 546$ nm | 1.493777 |
| $\lambda_3 = 656$ nm | 1.489197 |

The invention has been described in detail with particular reference to a preferred embodiment thereof, but it will be understood that variations and modifications can be effected within the spirit and scope of the invention.

What is claimed is:

1. A color corrected viewfinder having an optical axis, said viewfinder comprising in order from an object side:

a negative power lens component having a diffractive surface which introduces a phase modification $\phi(r)$ into a light wavefront passing through said diffractive surface, wherein $$\phi(r) = \sum_{i=1}^{i=n} \frac{2\pi}{\lambda_0} (C_i r^{2i}), \text{ where}$$

a) r is a height from the optical axis on the diffractive surface of the lens component,
b) $\lambda_0$ is a wavelength of light,
c) i is an integer from 1 to n,
d) $C_i$ is a set of coefficients defining the diffractive surface, and
e) $C_1$ is positive; and a positive power lens component receiving phase modified light from said negative power lens component;

said negative power lens component and said positive power lens component together form a demagnified, achromatized image of an object.

2. A viewfinder according to claim 1 wherein said diffractive surface is a surface facing said positive power lens component.

3. A viewfinder according to claim 1 wherein at least two of said $C_i$ coefficients are non zero to retard the edges of the outgoing wavefront emanating from said negative lens component.

4. A viewfinder according to claim 1, wherein said diffractive surface is curved.

5. A viewfinder according to claim 4, wherein said diffractive surface is concave.

6. A viewfinder according to claim 1, wherein said positive power lens component has a second diffractive surface which is also described by the phase modification $\phi(r)$ of claim 1.

7. A viewfinder according to claim 6 wherein said diffractive surface is a surface facing said negative power lens component.

8. A viewfinder according to claim 6, wherein said second diffractive surface is curved.

9. A viewfinder according to claim 7, wherein said second diffractive surface is convex.

10. A viewfinder according to claim 6, wherein said second diffractive surface is defined by the phase modification $\phi(r)$ in which the $C_1$ coefficient is negative.

11. A viewfinder according to claim 9, wherein at least two of said $C_i$ coefficients are non zero to retard the edges of the outgoing wavefront emanating from said positive lens component.

12. A viewfinder according to claim 11 wherein each of said coefficients $C_i$ has a sign opposite to the sign of its immediately preceding non-zero coefficient.

* * * * *